(12) United States Patent
Takemoto et al.

(10) Patent No.: US 12,485,840 B2
(45) Date of Patent: Dec. 2, 2025

(54) BUMPER REINFORCEMENT

(71) Applicants: NISSAN MOTOR CO., LTD., Yokohama (JP); RENAULT s.a.s., Boulogne-Billancourt (FR)

(72) Inventors: Shinichirou Takemoto, Kanagawa (JP); Shinya Mihara, Kanagawa (JP)

(73) Assignees: NISSAN MOTOR CO., LTD., Yokohama (JP); RENAULT S.A.S., Boulogne-Billancourt (FR)

( * ) Notice: Subject to any disclaimer, the term of this patent is extended or adjusted under 35 U.S.C. 154(b) by 437 days.

(21) Appl. No.: 18/031,841

(22) PCT Filed: Oct. 14, 2020

(86) PCT No.: PCT/IB2020/000841
§ 371 (c)(1),
(2) Date: Apr. 13, 2023

(87) PCT Pub. No.: WO2022/079458
PCT Pub. Date: Apr. 21, 2022

(65) Prior Publication Data
US 2024/0017690 A1    Jan. 18, 2024

(51) Int. Cl.
*B60R 19/04* (2006.01)
*B60R 19/18* (2006.01)
*B60R 19/34* (2006.01)

(52) U.S. Cl.
CPC .............. *B60R 19/04* (2013.01); *B60R 19/34* (2013.01); *B60R 2019/1866* (2013.01)

(58) Field of Classification Search
CPC ......... B60R 19/04; B60R 19/18; B60R 19/34; B60R 2019/186; B60R 2019/188; B60R 2021/0023
(Continued)

(56) References Cited

U.S. PATENT DOCUMENTS 4,130,312 A * 12/1978 Cooper, Sr. ............. B60R 19/04
    293/153
4,422,680 A * 12/1983 Goupy .................... B60R 19/18
    293/154
(Continued)

FOREIGN PATENT DOCUMENTS

EP          2 687 409 A1     1/2014
JP       2011-245910 A      12/2011
(Continued)

*Primary Examiner* — Gregory A Blankenship
(74) *Attorney, Agent, or Firm* — Foley & Lardner LLP

(57) ABSTRACT

A bumper reinforcement includes a main body made of metal, a reinforcing channel member, and a resin block. A mounting portion of a crash box is formed at a vicinity of each end of the main body. The reinforcing channel member includes a web, an upper flange and a lower flange that are placed on an outer panel, an upper panel and a lower panel of the main body at the mounting portion of the crash box, respectively. The reinforcing channel member is extended outward from the each end of the main body. The resin block is provided on an inner face of the reinforcing channel member. The resin block is contact with or joined to the outer panel and an inner panel of the main body at each end of the main body and extended from the each end to an outer edge of the reinforcing channel member.

8 Claims, 8 Drawing Sheets

(58) Field of Classification Search
USPC .................................................. 293/149–154
See application file for complete search history.

(56) References Cited

U.S. PATENT DOCUMENTS

| | | | |
|---|---|---|---|
| 9,358,941 B1* | 6/2016 | Harris ..................... B60R 19/18 |
| 9,550,463 B2 | 1/2017 | Hara |
| 10,214,169 B2 | 2/2019 | Schneider et al. |
| 2002/0043809 A1* | 4/2002 | Vismara .................. B60R 19/34 |
| | | | 293/133 |
| 2005/0236850 A1* | 10/2005 | Evans ...................... B60R 19/18 |
| | | | 293/102 |
| 2006/0181090 A1* | 8/2006 | Boivin .................... B60R 19/18 |
| | | | 293/146 |
| 2007/0029824 A1* | 2/2007 | Hodoya .................. B60R 19/18 |
| | | | 293/102 |
| 2009/0160204 A1* | 6/2009 | Czopek ................... B60R 19/18 |
| | | | 293/133 |
| 2013/0234456 A1* | 9/2013 | Brockhoff ............... B60R 19/18 |
| | | | 293/133 |
| 2014/0001780 A1 | 1/2014 | Inoue |
| 2015/0298634 A1 | 10/2015 | Hara |
| 2016/0144813 A1* | 5/2016 | Clauser ................... B60R 19/24 |
| | | | 293/133 |
| 2016/0347270 A1* | 12/2016 | Higashimachi ......... B60R 19/18 |
| 2017/0144619 A1* | 5/2017 | Shamoto ................. B60R 19/48 |
| 2017/0197572 A1* | 7/2017 | Fabiano .................. B60R 19/46 |
| 2017/0274849 A1* | 9/2017 | Jordan ..................... B60R 19/24 |
| 2017/0274851 A1 | 9/2017 | Schneider et al. |
| 2018/0257586 A1* | 9/2018 | Kitakata ................. B60R 19/18 |
| 2020/0031087 A1* | 1/2020 | Miura ..................... B32B 27/28 |
| 2023/0010241 A1* | 1/2023 | Wada ...................... B60R 19/04 |
| 2023/0405661 A1* | 12/2023 | Hashimura ........... B21D 39/203 |
| 2024/0017690 A1* | 1/2024 | Takemoto ............... B60R 19/34 |
| 2024/0270191 A1* | 8/2024 | Royer ................... B60R 19/023 |
| 2024/0399988 A1* | 12/2024 | Park ....................... B60R 19/34 |

FOREIGN PATENT DOCUMENTS

| | | |
|---|---|---|
| JP | 2015-147437 A | 8/2015 |
| JP | 2017-535469 A | 11/2017 |
| WO | WO-2014/088117 A1 | 6/2014 |

* cited by examiner

BUMPER REINFORCEMENT

TECHNICAL FIELD

The present invention relates to a bumper reinforcement to be attached to a front section or a rear section of a vehicle.

BACKGROUND ART

A bumper reinforcement is attached to a front section or a rear section of a vehicle body. More specifically, a bumper reinforcement is attached to front ends of paired side members via crash boxes. During a vehicle collision, the bumper reinforcement receives an impact force and transmits the impact force to the side members while collapsing the crash boxes.

In particular, there is a need for a vehicle body structure that is effective against a small overlap crash (sometimes called as a small offset crash) especially at a front section of a vehicle, which is a crash in which the impact force acts on a laterally outer side from a side member. This is because studies of actual crash patterns show that small overlap crashes occur frequently. In order to cope with small overlap crashes, a structure in which ends of a bumper reinforcement may be extended laterally outward from the side members is adopted.

In a case where the impact force acts on the middle portion of the bumper reinforcement between the paired side members, the impact force received by the middle portion can be transferred to both of the side members while collapsing both of the crash boxes. However, in a case of a small overlap crash where the impact force acts on the laterally outer end of the bumper reinforcement, the end may bend and buckle without receiving the impact force sufficiently. A Patent Literature 1 listed below discloses a structure using a steel reinforcing pipe connecting the laterally outer end of the bumper reinforcement to the side member (suspension tower) in consideration of a small overlap crash.

CITATION LIST

Patent Literature

Patent Literature 1: Japanese Unexamined Patent Application Publication (Translation of PCT Application) No. 2017-535469

SUMMARY OF INVENTION

Problem to be Solved by the Invention

The structure disclosed in the Patent Literature 1 requires the supplementary reinforcement member connecting the laterally outer end to the side member, and thereby increases the vehicle weight. The increase in weight leads to a deterioration of fuel efficiency. It also increases processes during vehicle body assembly. In addition, the increase in weight at the front/rear overhangs of the vehicle body significantly affects the vehicle dynamics. Therefore, an object of the present invention is to provide a lightweight and high-strength bumper reinforcement that works effectively against a small overlap crash.

Solution to Problem

An aspect of the present invention provides a bumper reinforcement that includes a reinforcement main body, a reinforcing channel member and a resin block. A crash box mounting portion is formed at a vicinity of each end of the reinforcement main body. The reinforcing channel member includes a web, an upper flange and a lower flange which overlap an outer panel, an upper panel and a lower panel of the reinforcement main body, respectively. The reinforcing channel member is attached to the each end of the reinforcement main body so as to extend outward from the each end. The resin block is provided on an inner surface of the reinforcing channel member. The resin block is contact with or joined to the each end of the reinforcement main body from the outer panel to an inner panel of the reinforcement main body, and is extended from the each end to an outer edge of the reinforcing channel member.

Advantageous Effects

According to the aspect, it is possible to provide a lightweight and high-strength bumper reinforcement that works effectively against a small overlap crash.

DESCRIPTION OF EMBODIMENTS

Hereinafter, bumper reinforcements 1 according to embodiments will be explained with reference to the drawings.

Figure 1:
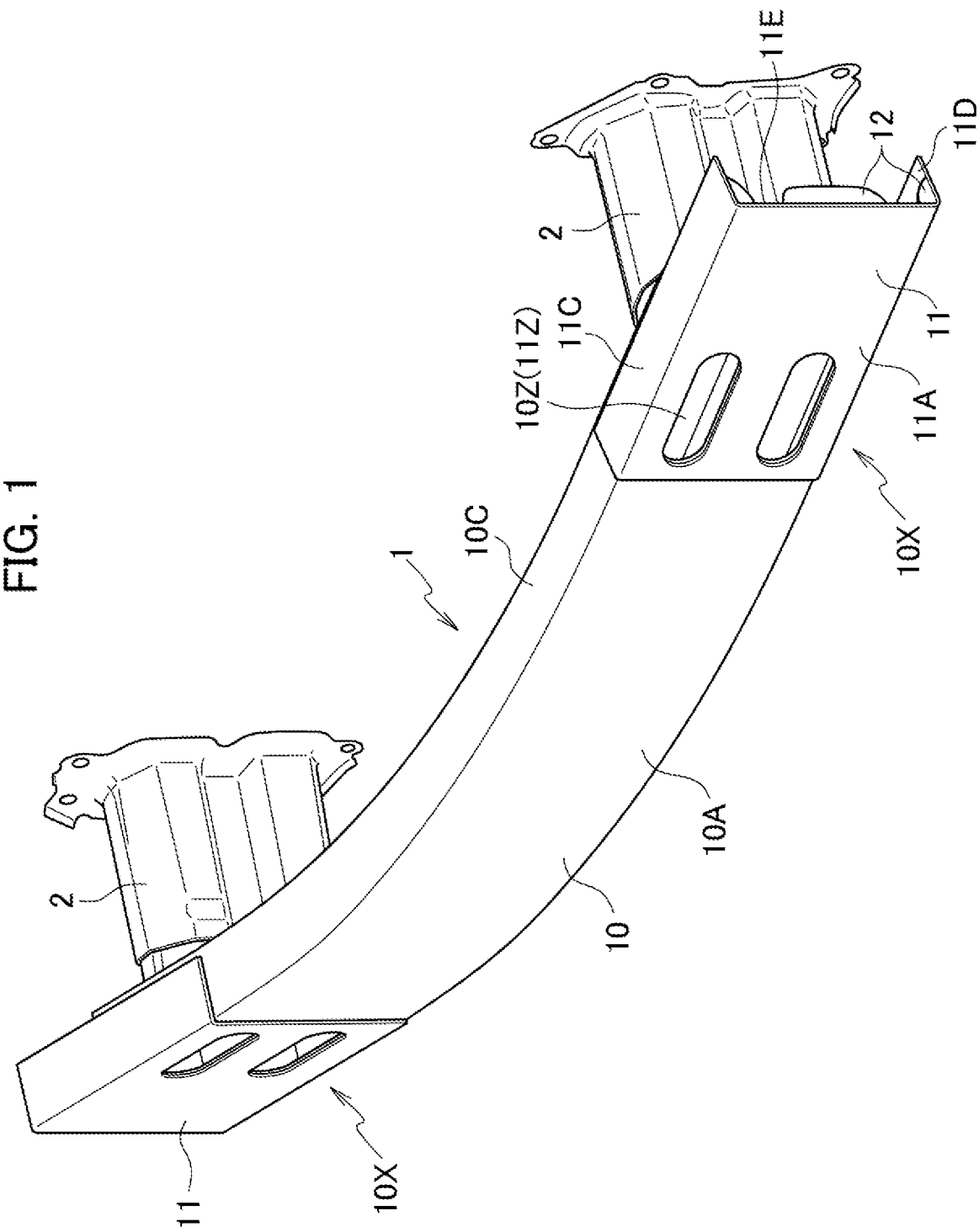
FIG. 1 is a perspective view of a bumper reinforcement, which is viewed from an outer side of a vehicle, according to a first embodiment.
Figure 2:
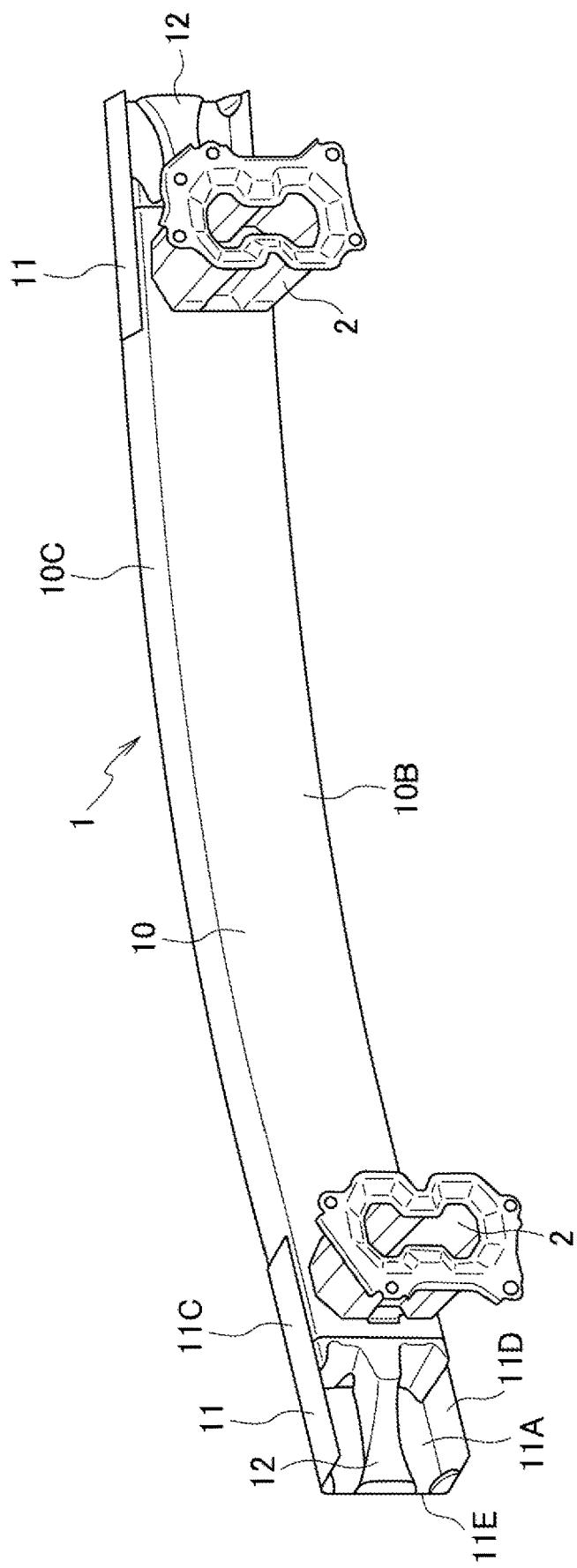
FIG. 2 is a perspective view of the bumper reinforcement, which is viewed from an inner side of the vehicle.

FIG. 1 and FIG. 2 show a state where a pair of crash boxes 2 is mounted on a bumper reinforcement 1 according to a first embodiment. The crash boxes 2 are attached to ends of paired side members (not shown) of a vehicle body, respectively. The bumper reinforcement 1 of the present embodiment is a front bumper reinforcement attached to a front section of a vehicle, but it may also be a rear bumper reinforcement attached to a rear section of a vehicle.

Figure 3A:
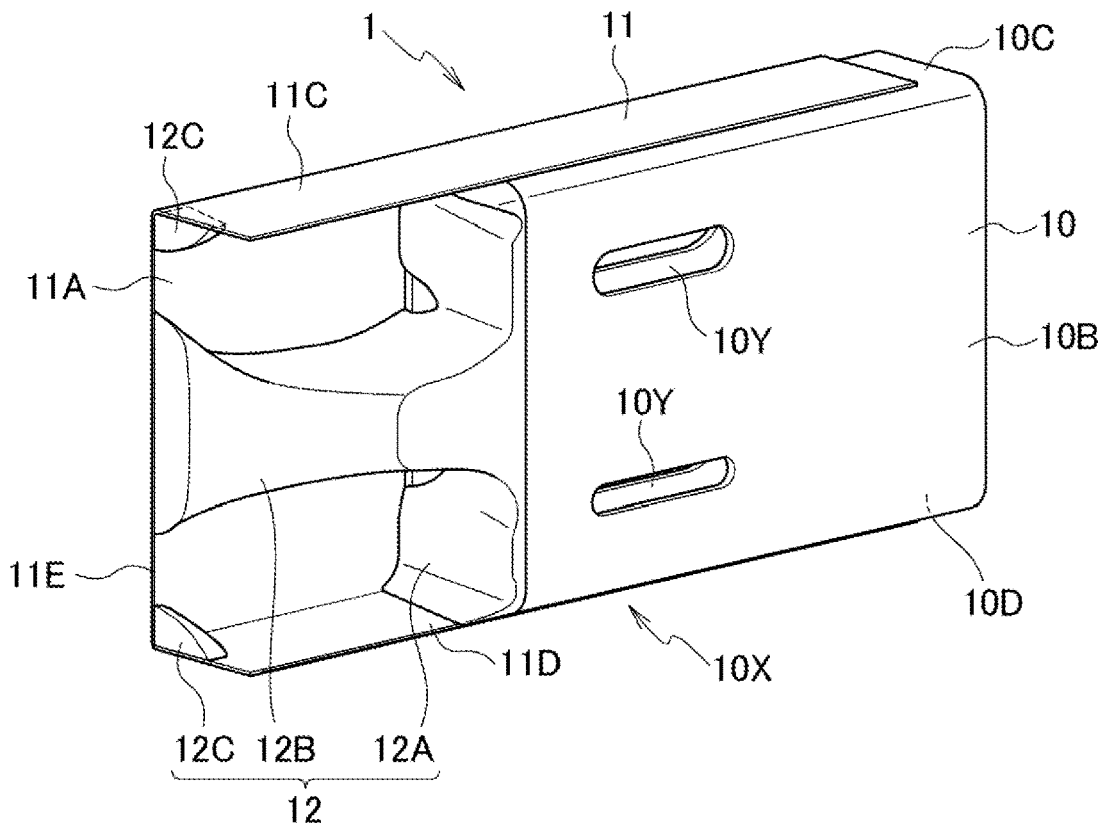
FIG. 3A is an enlarged perspective view of a laterally outer end of the bumper reinforcement.
Figure 3B:
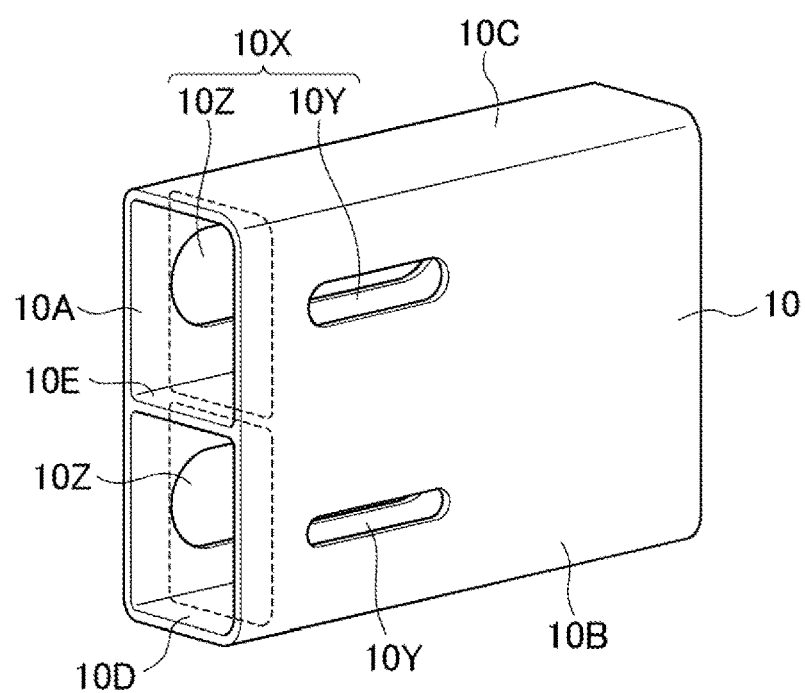
FIG. 3B is an enlarged perspective view of an end of a reinforcement main body of the bumper reinforcement shown in FIG. 3A.

The bumper reinforcement 1 includes a reinforcement main body 10 made of metal, reinforcing channel members 11 respectively attached to both ends of the reinforcement main body 10, and resin blocks 12 respectively provided on inner surfaces of the reinforcing channel members 11. The reinforcement main body 10 of the present embodiment is a long member having a hollow closed cross-section made by aluminum extrusion. The reinforcement main body 10 is configured of an outer panel an inner panel 10B, an upper panel 10C, and a lower panel 10D, as shown in FIG. 3B. The outer panel 10A is located on the outer side of the vehicle. The inner panel is located on the inner side of the vehicle. The upper panel 10C connects the upper edges of the outer panel 10A and the inner panel 10B, and the lower panel 10D connects the lower edges of the outer panel 10A and the inner panel 10B.

The reinforcement main body 10 may not have a closed cross-section as long as it has a hollow cross-section (e.g., C-shaped in cross-section with a longitudinal slit in the inner panel 10B). The reinforcement main body 10 of the present embodiment is an extruded aluminum member, but may also be a pressed steel member. In such a case, the above-mentioned slit may be formed. In addition, a longitudinal bead may be formed on the reinforcement main body 10 to improve its strength and rigidity.

The reinforcement main body 10 also includes an inside panel 10E therein, which is provided between the outer panel 10A and the inner panel 10B. The inside panel 10E is centered between the upper panel 10C and the lower panel 10D. In addition, a crash box mounting portion 10X for mounting the crash box 2 is formed at a vicinity of each end of the reinforcement main body 10. The crash box mounting portion 10X in the present embodiment is configured of a pair of bolt insertion holes 10Y formed in the inner panel 10B and a pair of tool access holes 10Z formed in the outer panel 10A.

Shafts of weld bolts (not shown) fixed to the crash box 2 are inserted through the bolt insertion holes 10Y. The bolt insertion hole(s) 10Y is a long horizontal hole, and the bolts are located at its both ends, respectively. A tool (socket), to which a nut to be fastened to the weld bolt has been set, accesses the end of the bolt through the tool access hole 10Z. The tool access hole 10Z is also a long horizontal hole, and its center axis is at the same height level as the center axis of the bolt insertion hole 10Y. Each of the crash boxes 2 is attached to the crash box mounting portion 10X by four bolts. As described later, tool access holes 11Z corresponding to the tool access holes 10Z are also formed in the reinforcing channel member 11 (see FIG. 1).

The reinforcing channel member 11 in the present embodiment is made of CFRP (carbon fiber reinforced plastic). The reinforcing channel member 11 may be made of FRP using reinforcing fibers other than carbon fiber (e.g., glass fiber), or may be made of metal (e.g., aluminum or steel such as (ultra) high-tensile steel). However, FRP contributes to weight reduction more than metal. The reinforcing fibers (carbon fibers) of the reinforcing channel member 11 are unidirectional continuous fibers and are oriented in the longitudinal direction of the reinforcement main body 10. However, FRP using cloth material made of interwoven reinforcing fibers or FRP in which unidirectional materials are laminated with their orientation directions crossed may also be used. The matrix resin of FRP may be either thermosetting resin or thermoplastic resin.

The reinforcing channel member 11 includes a web 11A, an upper flange 11C, and a lower flange 11D that overlap the outer panel 10A, the upper panel 10C, and the lower panel 10D of the reinforcement main body 10, respectively, at the crash box mounting portion 10X. In the present embodiment, the reinforcing channel member 11 is integrated with the reinforcement main body 10 during outsert-molding with the reinforcement main body 10, but may be fixed to the reinforcement main body 10 by structural adhesive. The reinforcing channel member 11 extends outward from each end of the reinforcement main body 10, and a resin block 12 is provided on the inner surface of this extended portion.

The resin block 12 in the present embodiment is made of CFRP (carbon fiber reinforced plastic). The resin block 12 may also be made of FRP with reinforcing fibers (e.g., glass fibers) other than carbon fibers. The reinforcing fibers (carbon fibers) of the resin block 12 are non-continuous fibers (short fibers), and the resin block 12 is formed by injection-molding. Therefore, the matrix resin of the FRP is thermoplastic resin. That is, the resin block 12 is made of CFRTP (carbon fiber reinforced thermo-plastic). The method of forming the reinforcing channel member 11 and the resin block 12 at each end of the reinforcement main body 10 will be described in detail later.

The resin block 12 in the present embodiment includes a base portion 12A, an extension portion 12B, and corner reinforcements 12C. The base portion 12A is in contact with an end face (end edge) of the reinforcement main body 10. The extension portion 12B extend from the base portion 12A to an outer edge 11E (see FIG. 3A) of the reinforcing channel member 11. The corner reinforcements 12C are formed at both ends of the outer edge 11E, respectively.

The base portion 12A is in contact with an almost entire of the end face (end edges of the panels 10A to 10E) of the reinforcement main body 10. In particular, the base portion 12A is in contact with the end face of the reinforcement main body 10 from the outer panel 10A to the inner panel 10B of the reinforcement main body 10. In other words, the base portion 12A is in contact with both the end edge of the outer panel 10A and the end edge of the inner panel 10B. The base portion 12A may just be in contact with the end face of the reinforcement main body 10, or it may further be inserted into the interior of the reinforcement main body 10 to be joined onto the end face of the reinforcement main body 10. In the present embodiment, the base portion 12A is joined onto the end face of the reinforcement main body 10 when the matrix resin is filled to the position indicated by the dotted lines in FIG. 3B during injection-molding of the base portion 12A and the extension portion 12B.

The width (in the front-back direction) of a portion, on a side of the base portion 12A, of the extension portion 12B is the same as the width of the reinforcement main body 10. The width of the outer edge 11E of the extension portion 12B is smaller than the width of the portion on the side of the base portion 12A. That is, the width of the extension portion 12B is gradually reduced from the base portion 12A to the outer edge 11E. In addition, the height of the portion, on the side of the base portion 12A, of the extension portion 12B is gradually increased from the base portion 12A to the outer edge 11E. The extension portion 12B effectively prevents the reinforcing channel member 11 from buckling inward. Note that the corner reinforcements 12C are formed to keep the channel shape of the reinforcing channel member 11. The extension portion 12B is in contact with the inside panel 10E of the reinforcement main body 10 via the base portion 12A. Accordingly, the impact force input to the web 11A of the reinforcing channel member 11 is supported by the reinforcement main body 10 via the extension portion 12B and the inside panel 10E. As a result, the reinforcing channel member 11 can be prevented from buckling inward more firmly.

The reinforcing channel member 11 reinforces the crash box mounting portion 10X of the reinforcement main body 10 from the outside, and thereby improves the strength and rigidity of the crash box mounting portion 10X. Therefore, the bumper reinforcement 1 can be prevented from buckling inward at the crash box mounting portion 10X during a small overlap crash. The crash box mounting portion 10X is easily crushed, because the bolt insertion holes 10Y and the tool access holes 10Z formed thereon and it is supported from behind by the crash box 2 (the side member). The reinforcing channel member 11 suppresses this crushing. In this case, the reinforcing channel member 11, which is made of FRP to have excellent tensile strength, can effectively resist the impact force and thereby contributes to weight reduction.

Furthermore, the unidirectional continuous fibers of the reinforcing channel member 11 are oriented in the longitudinal direction of the reinforcement main body 10. Therefore, it can effectively resist a tensile force acting on the reinforcing channel member 11 due to the impact force. The FRP can effectively resist a tensile force acting in the orientation direction of the reinforcing fibers. Note that, also in a case of using FRP using a cloth material with interwoven reinforcing fibers or FRP in which unidirectional materials are laminated by crossing their orientation directions as explained above, the FRP can effectively resist a tensile force acting in the longitudinal direction of the reinforcement main body 10.

Also in a case where the reinforcing channel member 11 is made of metal, it can resist an impact force more effectively along with achieving weight reduction than a case of extending the reinforcement main body 10. Especially in a case where the reinforcement main body 10 is made of lightweight aluminum and the reinforcing channel member 11 is made of (ultra) high-tensile steel with excellent strength and rigidity, the bumper reinforcement 1 can be optimized according to its location in terms of strength and rigidity.

Furthermore, in the present embodiment, the reinforcing channel member 11 can be prevented from buckling inward not only by the above-mentioned reinforcing channel member 11, but also by the resin block 12. Since the resin block 12 is made of resin, it can effectively resist a tensile force acting on the resin block 12 due to the impact force while contributing to weight reduction. Since the positional relationship between the extension portion 12B of the resin block 12 and the inside panel 10E of the reinforcement main body 10 is also optimized as mentioned above, the reinforcing channel member 11 can be prevented from buckling inward in this regard.

Therefore, the impact force can be effectively transmitted to the crash box 2 even in a small overlap crash, and thereby energy can be absorbed effectively by crushing the crash box 2. Furthermore, even after the crash box 2 is completely crushed, the impact force can be effectively transferred to the side member. Here, if the resin block 12 is inserted inside from the end of the reinforcement main body 10, the reinforcement main body 10 can be more effectively prevented from crushing at the crash box mounting portion 10X.

Figure 4A:
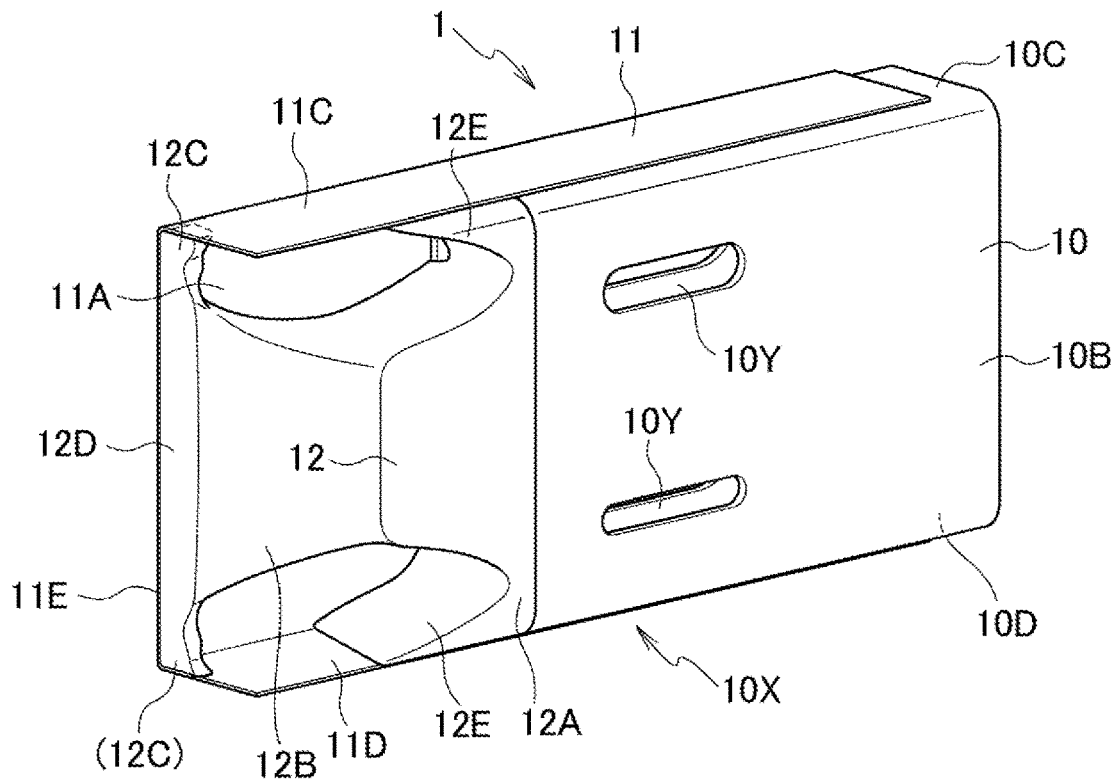
FIG. 4A is an enlarged perspective view of a laterally outer end of a bumper reinforcement according to a modified example 1.
Figure 4B:
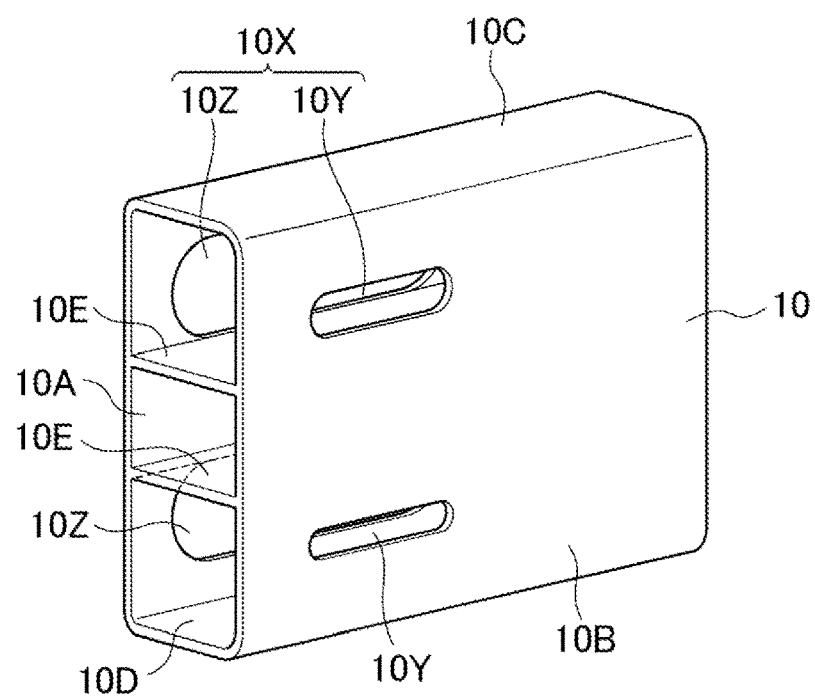
FIG. 4B is an enlarged perspective view of an end of a reinforcement main body of the bumper reinforcement shown in FIG. 4A.

FIG. 4A and FIG. 4B show a modified example 1. Hereinafter, only the configurations that differ from the configurations of the above-described first embodiment will be described. Redundant descriptions for the configurations identical or equivalent to the configurations of the above-described first embodiment will be omitted. In the present modified example, the reinforcement main body 10, which is an extruded aluminum member, is provided with two inside panels 10E. Then, the height (in the vertical direction) of the extension portion 12B of the resin block 12 is made large to cover both of these two inside panels 10E.

In this way, the extension portion 12B contacts the two inside panels 10E via the base portion 12A. Therefore, the impact force input to the web 11A of the reinforcing channel member 11 is supported by the reinforcement main body 10 via the extension portion 12B and the two inside panels 10E. As a result, the reinforcing channel member 11 can be prevented from buckling inward more firmly.

In addition, in the present modified example, an end portion 12D of the resign block 12 on a side of the outer edge 11E of the reinforcing channel member 11 is extended from the lower flange 11D to the upper flange 11C on the web 11A. In other words, the end portion 12D of the resin block 12 is integrally formed with the corner reinforcements 12C of the first embodiment. The outer edge 11E of the reinforcing channel member 11 is an open end and is weak in terms of strength and rigidity. Therefore, by further reinforcing the outer edge 11E with the end portion 12D of the resin block 12, the reinforcing channel member 11 can be prevented from buckling more effectively. This structure can also be applied to the above-described first embodiment.

Furthermore, in the present modified example, the base portion 12A is extended outward from the end of the reinforcement main body 10 along the upper flange 11C and extended outward from the end of the reinforcement main body 10 along the lower flange 11D (see a pair of extended portions 12E in FIG. 5). By forming the extended portions 12E in this manner, the impact force input to the reinforcing channel member 11 during a small overlap crash can be effectively transmitted to the reinforcement main body 10 via the upper flange 11C and the lower flange 11D and the extended portions 12E. Therefore, the reinforcing channel member 11 can be prevented from buckling inward more effectively. This structure can also be applied to the above-described first embodiment.

The present modified example becomes heavier than the first embodiment by one of the inside panels 10E and the volume increase of the resin block 12. However, their weight is not so large, and the increased weight of the resin block 12 is small because it is made of resin. Instead, high strength and rigidity can be achieved, so one of them should be selected as appropriate in consideration of the vehicle weight and so on. In addition, as described above, the end portion 12D or the extended portions 12E can also be selectively applied to the first embodiment.

Figure 5A:
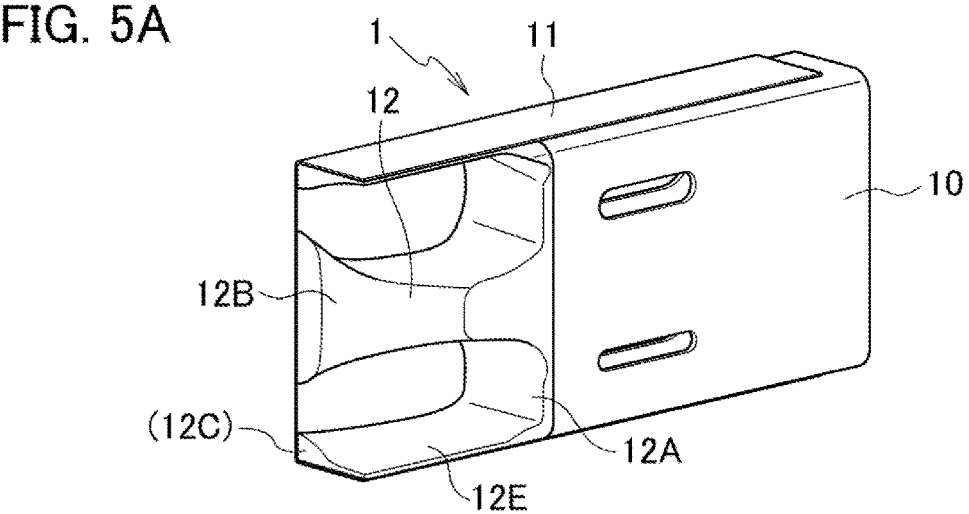
FIG. 5A is an enlarged perspective view of a laterally outer end of a bumper reinforcement according to a modified example 2.
Figure 5B:
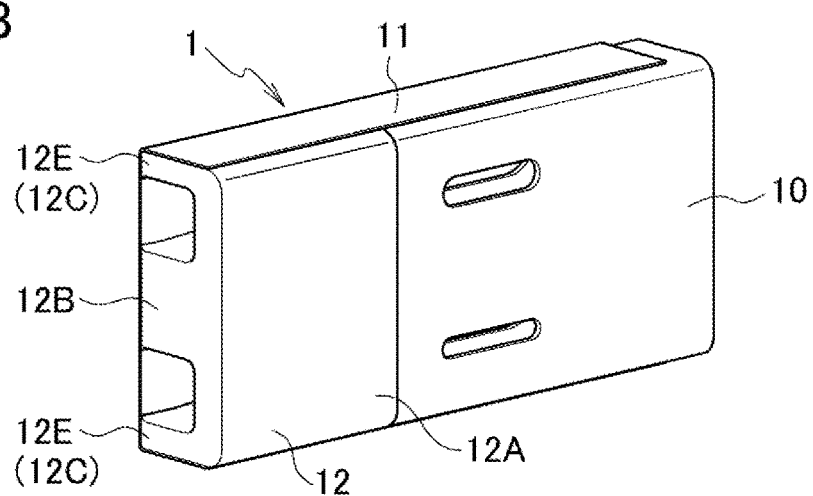
FIG. 5B is an enlarged perspective view of a laterally outer end of a bumper reinforcement according to a modified example 3.
Figure 5C:
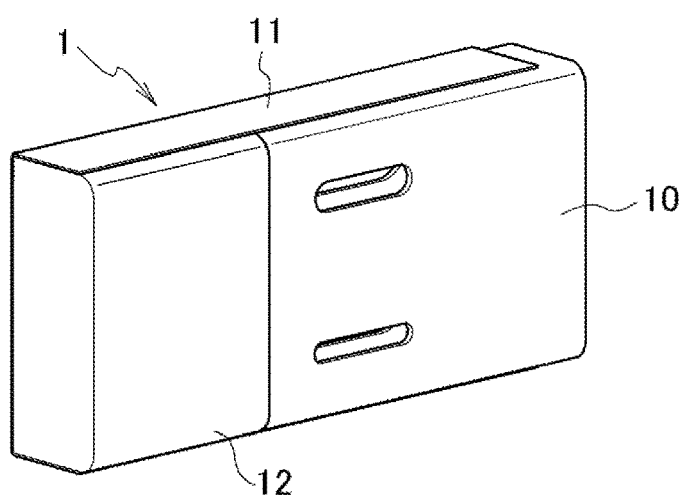
FIG. 5C is an enlarged perspective view of a laterally outer end of a bumper reinforcement according to a modified example 4.

Modified examples 2 to 4 regarding the shape of the resin block 12 are shown in FIG. 5A through FIG. 5C, respectively. Redundant descriptions for the configurations identical or equivalent to the configurations of the above-described first embodiment will be omitted. In the modified example 2 shown in FIG. 5A, the extended portions 12E are made by extending the corner reinforcements 12C of the modified example 1. This configuration provides the above-described effect brought by the extended portions 12E, and can reinforce the outer edge 11E (the open end) of the reinforcing channel member 11. In addition, its increase in weight due to the resin block 12 is minimal.

In the modified example 3 shown in FIG. 5B, the resin block 12 has an E-shaped cross section to have a configuration where the extension portion 12B and a pair of the extended portions 12E (including the corner reinforcements 12C) are integrated as a single panel on its inner side. Although not visible in FIG. 5B, the resin block 12 also has the base portion 12A. This configuration provides the above-described effect brought by the extended portions 12E of the modified example 2. In addition, the extension portion 12B and the extended portions 12E are integrated on the inner side, and thereby the strength and rigidity of the resin block 12 is further enhanced.

In the modified example 4 shown in FIG. 5C, the resin block 12 has a solid rectangular parallelepiped shape that is in contact with the entire inner surface of the extended portion of the reinforcing channel member 11 that extended from the reinforcement main body 10. That is, the present modified example has a configuration in which the interior space of the resin block 12 in the above-described modified example 3 is filled (all of the base portion 12A, the extension portion 12B, and the extended portions 12E including the corner reinforcements 12C are integrated to be monolithic). This configuration provides the above-described effect brought by the resin block 12 of the modified example 3, and the strength and rigidity of the resin block 12 is further enhanced.

Next, methods for forming the reinforcing channel member 11 and the resin block 12 at the end of the reinforcement main body 10 will be described. Various methods are possible, but some examples will be described.

The reinforcing channel member 11 in the present embodiment is made of FRP, but an example of a case where the reinforcing channel member 11 is made of metal is described first. A component in which the resin block 12 is formed on the inner surface of the reinforcing channel member 11 is preliminarily made. Then, this component is attached to the end of the reinforcement main body 10. At first, a metal panel is pressed to form the reinforcing channel member 11. The tool access holes 11Z are also formed in the reinforcing channel member 11. Next, a surface treatment is applied to the inner surface of the reinforcing channel member 11 that is to be in contact with the resin block 12. The surface treatment is a surface roughening process to improve the joining strength with the resin block 12. The surface roughening process may be a sandblasting process, but a chemical treatment is used to form micro recesses on the inner surface in the present embodiment. The micro recess(es) formed by the chemical treatment has a shape that widens in its inside. Therefore, the resin of the injection-molded resin block 12 enters into the micro recesses and then cures to exert an anchoring effect. The resin block 12 is formed by injection-molding non-continuous fiber reinforced thermoplastics in a molding die in which the reinforcing channel member 11 has been set preliminarily (so-called an outsert-molding).

Figure 6:
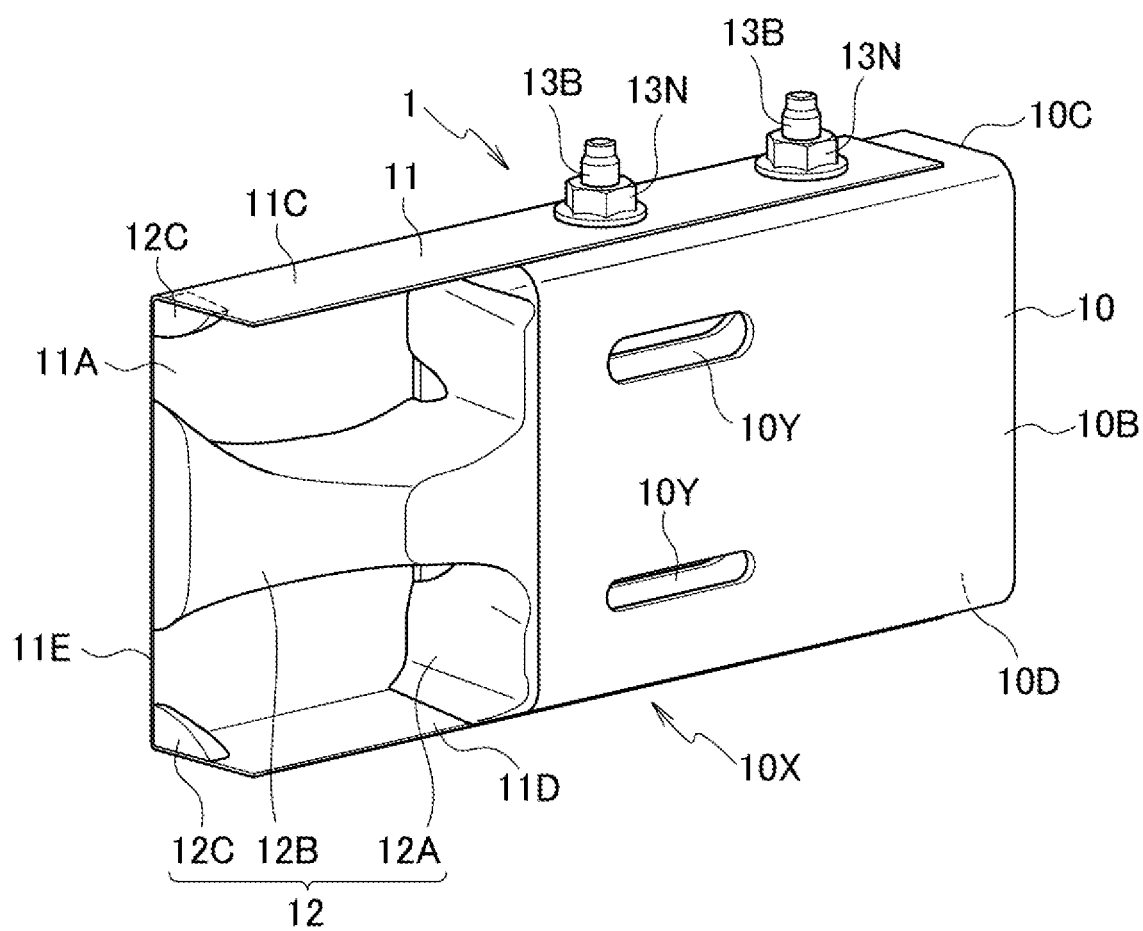
FIG. 6 is a perspective view of a case where a reinforcing channel member is fastened by bolts.

Then, the integrated reinforcing channel member 11 and the resin block 12 are attached to the end(s) of the reinforcement main body 10 with structural adhesive. Note that the reinforcing channel member 11 and the resin block 12 may be attached to the end(s) of the reinforcement main body 10 by bolts 13B and nuts 13N as shown in FIG. 6. In this case, the head of bolt 13B can be accessed through the tool access holes 10Z and 11Z. Alternatively, a weld nut may be attached to the reinforcement main body 10 and the bolt may be fastened from the outside. In addition, the reinforcing channel member 11 and the resin block 12 may be attached to the end(s) of the reinforcement main body 10 by rivets.

Next, an example of a case where the reinforcing channel member 11 is made of FRP is described. The reinforcing channel member 11 and the resin block 12 are outsert-molded together with the reinforcement main body 10. A surface treatment is applied to the surfaces of the reinforcement main body 10 that are in contact with the reinforcing channel members 11 and the resin blocks 12. This surface treatment is the same as the surface treatment described above, in which a chemical treatment is used to form micro recesses that provide an anchoring effect. Here, the surface treatment is also applied to the edge faces (end edges) of the reinforcement main body 10 that is in contact with the base portions 12A of the resin blocks 12.

In addition, since the resin block(s) 12 is formed to enter into the interior of the reinforcement main body 10 here, the surface treatment is also applied to each inner surface of the end portions of the reinforcement main body 10. Subsequently, the continuous fiber reinforced plastic that will form the reinforcing channel member 11 is set in the molding die. If the continuous fiber reinforced plastic is a thermosetting plastic, its prepregs may be set in the molding die. If the continuous fiber reinforced plastic is a thermoplastic resin, sheet materials that have been pre-warmed and softened may be set in the molding die.

Then, the end portion of the reinforcement main body 10 is also set in the molding die, and the molding die is closed to injection-mold the resin block 12. The resin block 12 is formed by injection-molding a non-continuous fiber reinforced thermoplastic (so-called outsert-molding). In a case where the continuous fiber reinforced resin of the reinforcing channel member 11 is thermosetting plastic, after the molding die is preheated to make the thermosetting plastic liquidized and then gelled and then its thermosetting reaction is started, the resin block 12 is injection-molded. In this case, the cavity in the molding die may be evacuated. Note that the tool access holes 11Z of the reinforcing channel member 11 may be formed preliminarily on the prepregs or the sheet material or may be formed after the outsert-molding.

During the injection-molding of the resin block 12, the injected thermoplastic resin must be restricted from entering excessively into the interior of the reinforcement main body 10. In the present embodiment, foam resin is preliminarily placed inside the reinforcement main body 10 in order to restrict the incursion of the thermoplastic resin to be injected. The position of the foam resin is regulated by protrusions, which protrude from the inner surface of the molding die and are inserted into the reinforcement main body 10 through the tool access holes 10Z. Alternatively, a jig that restricts the excessive incursion of the thermoplastic resin may be placed inside the reinforcement main body 10 by utilizing the tool access holes 10Z. The jig will be removed after injection-molding the resin block 12. Alternatively, the interior of the reinforcement main body 10 may be filled with foam material and the foam material may be cut at the same time when forming the tool access holes 11Z of the reinforcing channel member 11 after the resin block 12 is formed.

According to the present embodiment (and its modified examples 1-3), the reinforcing channel member 11 is attached to the reinforcement main body 10 at the crash box mounting portion 10X. Here, the web 11A, the upper flange 11C and the lower flange 11D of the reinforcing channel member 11 overlap the outer panel 10A, the upper panel 10C and the lower panel 10D of the reinforcement main body 10, respectively. The reinforcing channel member 11 extends outward from each end of the reinforcement main body 10, and the resin block 12 is provided on the inner surface of this extended portion. The resin block 12 (the base portion 12A)

is contact with or joined to each end of the reinforcement main body 10 from the outer panel 10A to the inner panel 10B of the reinforcement main body 10. The resin block 12 (the extension portion 12B) is extended from each end of the reinforcement main body 10 to the outer edge 11E of the reinforcing channel member 11.

Since the reinforcing channel member 11 covers the crash box mounting portion 10X of the reinforcement main body 10, the reinforcement main body 10 can be prevented from buckling at the crash box mounting portion 10X during a small overlap crash. In addition, the extended portion of the reinforcing channel member 11 that is extended from the end of the reinforcement main body 10 has the resin block 12 formed on its inner surface, and thereby the reinforcing channel member 11 can be prevented from buckling inward. In particular, (the extension portion 12B of) the resin block 12 is extended from each end of the reinforcement main body 10 to the outer edge 11E. Furthermore, (the base portion 12A of) the resin block 12 is in contact with or joined to each end of the reinforcement main body 10 from the outer panel 10A to the inner panel 10B. Therefore, the resin block 12 can effectively resist the impact force input to the web 11A of the reinforcing channel member 11 and can prevent the reinforcing channel member 11 from buckling inward. In other words, the impact force can be effectively received at the end face (end edge) of the reinforcement main body 10 via the extension portion 12B and the base portion 12A. As a result, the impact force in a small overlap crash can be reliably transmitted to the crash box 2 and the side member. In addition, since the resin block 12 is made of resin, weight increase can be suppressed.

If a bumper reinforcement with the same strength and rigidity as those brought by the present embodiment were to be realized using only metal, its weight would be extremely heavy. On the other hand, if a bumper reinforcement with the same strength and rigidity as those brought by the present embodiment were to be realized using only FRP, its manufacturing cost will be high and its yield rate will become low. In the present embodiment, a hybrid structure of metal and FRP is used to achieve high strength and rigidity while reducing the weight increase. Meanwhile, the increase in manufacturing cost can be suppressed and the deterioration of yield rate can also be suppressed.

In addition, in the present embodiment (and its modified examples 1-3), the reinforcing channel member 11 is made of metal or continuous fiber FRP, and the resin block 12 is made of non-continuous fiber FRTP. Since the reinforcing channel member 11 is made of metal or continuous fiber FRP, it can effectively resist an impact force in a small overlap crash as described above. In particular, if the reinforcing channel member 11 is made of continuous fiber FRP, the reinforcing channel member 11 is also formed of resin in addition to the resin block 12, further the weight increase can be suppressed further.

In addition, since the resin block 12 is made of non-continuous fiber FRTP, the resin block 12 can also effectively resist the impact force described above, and the resin block 12 can be formed by injection-molding. Since the resin block 12 can be formed by injection-molding, the shape of the resin block 12 can be optimized and the weight increase of the resin block 12 can be restricted. The reinforcing channel member 11 and the resin block 12 can prevent the reinforcing channel member 11 from buckling inward more effectively. According to the prevention of the inward buckling of the reinforcing channel member 11, it becomes possible to resist a small overlap crash effectively.

Furthermore, the reinforcing channel member 11 is made of unidirectional continuous fiber FRP, and said continuous fibers are oriented in the longitudinal direction of the reinforcement main body 10 here. Since the direction of the tensile force acting on the reinforcing channel member 11 during a small overlap crash coincides with the orientation of the continuous fibers, the reinforcing channel member 11 can effectively resist this tensile force.

In addition, in the modified example 1 of the present embodiment (see FIG. 4A and FIG. 4B), the end portion of the resin block 12 on a side of the outer edge 11E of the reinforcing channel member 11 is extended from the lower flange 11D to the upper flange 11C on the web 11A. Therefore, the strength and rigidity of the outer edge 11E, which is an open end, of the reinforcing channel member 11 is improved, and thereby the reinforcing channel member 11 can be prevented from buckling more effectively.

In addition, in the modified examples 1-2 of the present embodiment (see FIG. 4A to FIG. 5B), the base portion 12A of the resin block 12 on a side of the reinforcement main body 10 is extended outward from each end of the reinforcement main body 10 along the upper flange 11C and the lower flange 11D (the extended portions 12E). Therefore, the impact force input to the reinforcing channel member 11 during a small overlap crash can be effectively transmitted to the reinforcement main body 10 via the upper flange 11C, the lower flange 11D and the extended portions 12E. As a result, the reinforcing channel member 11 can be prevented from buckling inward more effectively.

In addition, in the present embodiment (and the modified examples 1-3), the reinforcement main body 10 includes the inner panel(s) 10E, and the end portion of the extension portion 12B of the resin block 12 on a side of the reinforcement main body 10 also contacts the end edge of the inside panel 10E (via the base portion 12A). Therefore, the impact force input to the web 11A of the reinforcing channel member 11 is supported by the reinforcement main body 10 via the extension portion 12B and the inner panel(s) 10E. As a result, the reinforcing channel member 11 can be prevented from buckling inward more effectively.

In addition, in the present embodiment (and the modified examples 1-3), the resin block 12 (the base portion 12A) enters into the interior of the reinforcement main body 10. Therefore, the resin block 12 can be prevented from bending with respect to the reinforcement main body 10 and thereby the reinforcing channel member 11 can be prevented from buckling inward more effectively. Furthermore, the impact force input to the reinforcing channel member 11 can be reliably transmitted to the reinforcement main body 10 via the resin block 12. Furthermore, the resin block 12 that enters from the end of the reinforcement main body 10 to the interior thereof can effectively prevents the crash box mounting portion 10X from collapsing.

Figure 7:
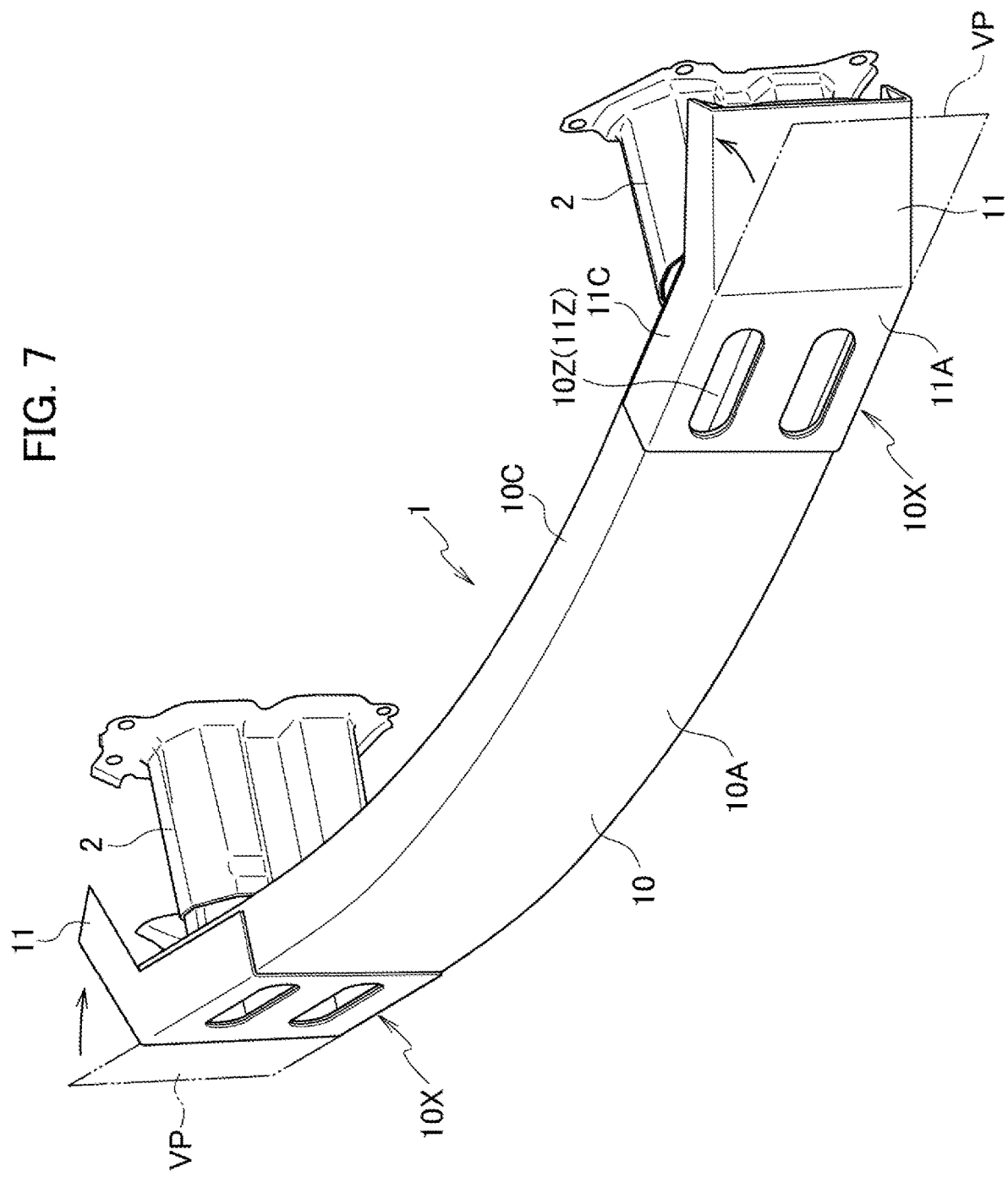
FIG. 7 is a perspective view of a bumper reinforcement, which is viewed from an outer side of a vehicle, according to a second embodiment.
Figure 8:
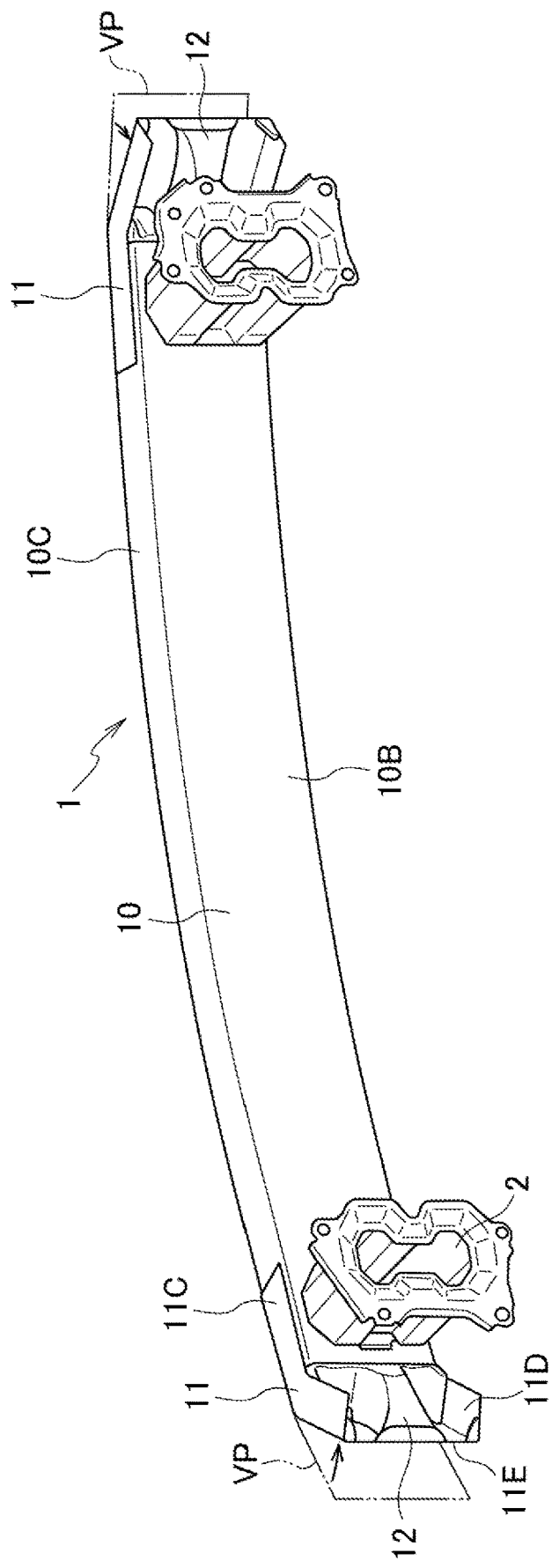
FIG. 8 is a perspective view of the bumper reinforcement, which is viewed from an inner side of the vehicle.

FIG. 7 and FIG. 8 show a second embodiment of the bumper reinforcement 1. Only the configurations that differ from those of the first embodiment will be described below. In addition, the above-described various modified examples can be applied to the present embodiment as well. In the present embodiment, the extended portion of the reinforcing channel member 11 that is extended from the reinforcement main body 10 is bent inwardly with respect to an extended virtual plane VP of the outer panel 10A of the reinforcement main body 10. Each material and forming method of the components are the same as those in the above-described first embodiment. According to this configuration, the same effects as those brought in the above-described first embodiment can be brought.

Aerodynamic design and appearance design require that the four corners of a vehicle be rounded. Rounding the four corners of a vehicle also improves the maneuverability of the vehicle. In this case, it is necessary to bend the outside of the bumper reinforcement 1 from the side member inward as shown in the present embodiment. If the entire bumper reinforcement is formed as a single long piece of metal, the extended portion extended from the side member will buckle in a small overlap crash (see [Background] section). However, according to the present embodiment, the strength and rigidity of the extended portion can be increased, so it can adequately resist a small overlap crash.

In a small overlap crash, where an impact force is input from the front (rear) section of the vehicle, when the impact force is input to the extended portion bent inward, part of the impact force acts as a force that moves the front section of the vehicle laterally and can deflect the impact force. As a result, the wheel can be prevented from colliding with the lower part of the A-pillar (the lowest front end of the cabin space) due to the input of the impact force to the road wheel. Furthermore, the impact force input obliquely to the extended portion bent inward can be received more easily, and thereby crash resistance performance can be improved.

Note that the above-mentioned extended portion of the reinforcing channel member 11 is bent at an angle with respect to the outer panel 10A in the present embodiment, but the extended portion may be gently curved with respect to the outer panel 10A to be placed on an inner side from the extended virtual plane VP.

Note that the present invention is not limited to the above-described embodiments. For example, even when the reinforcing channel member 11 is made of FRP, the reinforcing channel member 11 and the resin block 12 that have been preliminarily integrated with each other may be attached to the end of the reinforcement main body 10.

REFERENCE SIGNS LIST 1 bumper reinforcement
2 crash box
10 reinforcement main body
10A outer panel
10B inner panel
10C upper panel
10D lower panel
10E inside panel
10X crash box mounting portion
11 reinforcing channel member
11A web
11C upper flange
11D lower flange
11E outer edge
12 resin block
12A base portion
12B extension portion
12C corner reinforcement
12D end portion
12E extended portion
VP extended virtual plane

The invention claimed is:
1. A bumper reinforcement comprising:
a reinforcement main body that is a long member made of metal and has a hollow cross-section;
a crash box mounting portion that is formed at a vicinity of each end of the reinforcement main body;
a reinforcing channel member that includes a web, an upper flange and a lower flange which overlap an outer panel, an upper panel and a lower panel of the reinforcement main body, respectively, at the crash box mounting portion, and attached to the each end so as to extend outward from the each end; and
a resin block that is provided on an inner surface of the reinforcing channel member, and is contact with or joined to the each end from the outer panel to an inner panel of the reinforcement main body, and is extended from the each end to an outer edge of the reinforcing channel member.

2. The bumper reinforcement according to claim 1, wherein an extended portion of the reinforcing channel member that is extended outward from the reinforcement main body is bent or curved inward with respect to an extended virtual plane of the outer panel of the reinforcement main body.

3. The bumper reinforcement according to claim 1, wherein the reinforcing channel member is made of metal or continuous fiber FRP, and the resin block is made of non-continuous fiber FRTP.

4. The bumper reinforcement according to claim 3, wherein the reinforcing channel member is made of unidirectional continuous fiber FRP, and continuous fibers thereof are oriented in a longitudinal direction of the reinforcement main body.

5. The bumper reinforcement according to claim 1, wherein an end portion of the resin block on a side of the outer edge of the reinforcing channel member is extended on the web from the lower flange to the upper flange.

6. The bumper reinforcement according to claim 1, wherein a base portion of the resin block on a side of the reinforcement main body is extended outward from the each end of the reinforcement main body along the upper flange, and is extended outward from the each end of the reinforcement main body along the lower flange.

7. The bumper reinforcement according to claim 1, wherein the reinforcement main body includes an inside panel provided therein between the outer panel and the inner panel, and
wherein an end portion, on a side of the reinforcement main body, of an extension portion of the resin block that is extended to the outer edge of the reinforcing channel member is in contact with an end edge of the inside panel.

8. The bumper reinforcement according to claim 1, wherein an end of the resin block on a side of the reinforcement main body is inserted into an interior of the reinforcement main body.

* * * * *